(12) United States Patent
Huang et al.

(10) Patent No.: US 7,612,461 B2
(45) Date of Patent: Nov. 3, 2009

(54) INTEGRATIVE COMBINED VEHICLE POWER ALLOTMENT MECHANISM

(75) Inventors: Kuohsiu David Huang, Taoyuan (TW); Kei-Lin Kuo, Baoshan Township, Hsinchu County (TW)

(73) Assignee: National Taipei University of Technology, Taipei (TW)

( * ) Notice: Subject to any disclaimer, the term of this patent is extended or adjusted under 35 U.S.C. 154(b) by 309 days.

(21) Appl. No.: 11/828,020

(22) Filed: Jul. 25, 2007

(65) Prior Publication Data

US 2009/0026772 A1    Jan. 29, 2009

(51) Int. Cl.
*B60K 6/42* (2007.10)
*F16H 3/72* (2006.01)
(52) U.S. Cl. .......... 290/40 C; 475/5; 180/65.3
(58) Field of Classification Search ........... 290/3, 290/4 R, 40 R, 40 C, 45; 475/5, 3; 180/65.2, 180/65.3
See application file for complete search history.

(56) References Cited

U.S. PATENT DOCUMENTS

| | | | | |
|---|---|---|---|---|
| 4,495,836 A | * | 1/1985 | Cohen | 475/31 |
| 6,007,443 A | * | 12/1999 | Onimaru et al. | 475/5 |
| 6,558,289 B2 | * | 5/2003 | Chung | 477/3 |
| 6,962,545 B2 | * | 11/2005 | Larkin | 475/5 |
| 7,264,071 B2 | * | 9/2007 | Schmidt et al. | 180/65.6 |
| 7,273,120 B2 | * | 9/2007 | Tabata | 180/65.265 |
| 7,520,353 B2 | * | 4/2009 | Severinsky et al. | 180/65.28 |
| 7,556,578 B2 | * | 7/2009 | Sah et al. | 475/5 |
| 2009/0029828 A1 | * | 1/2009 | Huang et al. | 477/115 |

* cited by examiner

*Primary Examiner*—Nicholas Ponomarenko
(74) *Attorney, Agent, or Firm*—Chun-Ming Shih (57) ABSTRACT

An integrative combined vehicle power allotment mechanism includes an electric energy unit, an electric power control unit, an electric power unit, a heat power unit, an one-way clutch unit, a power allotment unit, and a speed change unit. The electric energy unit formed of a storage battery, the heat power unit formed of an internal combustion engine, and the one way clutch unit are disposed in different positions in the power allotment unit. Through dexterously designed energy management, the vehicle is driven with individual electric or mechanical power, or the combination thereof in a best condition so as to achieve the aim of energy saving.

10 Claims, 8 Drawing Sheets

INTEGRATIVE COMBINED VEHICLE POWER ALLOTMENT MECHANISM

BACKGROUND OF THE INVENTION

1. Field of the Invention

The present invention relates to an integrative combined vehicle power allotment mechanism, and more particularly, to a mechanism in which driving powers like electric, mechanical powers, or the like are integrative combined and allotted through a computer system so as to provide the speed change unit of the vehicle with the preferable driving power thereby enabling the vehicle to run in the best mood with minimum fuel consumption.

2. Description of the Prior Art

Stimulated by elevated environmental consciousness and awareness of energy crisis, most of nations in the world have set up related ordinances to limit the use of high pollution and low efficiency fuel for vehicles that spurs the debut of recent electric power driven vehicle which is free from the worry of environmental contamination and luxurious consumption of fuel that the traditional vehicles are committing.

Meanwhile, the newly high lighted electric power driven vehicle employs various kinds of battery as its power source, there arise problems of long time duration for charging, shortage in continuous mileage running ability and poor crumbing power. In addition, the high price of its power source, the fuel storage battery, becomes a big obstacle for its development.

Recently, the demerits described above have been rectified somewhat degree by presenting a combined power vehicle in which some newly developed power sources are employed in order to make such a vehicle to play a roll of transient product between the traditional gasoline vehicle and the future possible pure electric power vehicle.

As the combined power vehicle consists of both motor and internal combustion engine in it, it has the features of capable of stop/start in idle speed, generation of electricity, regenerative braking, pure electric power driving etc. so as to effectively attain the aim of low fuel consumption and low air pollution. How to further improve such advantages remains as a task for the mankind to tackle.

For this, the applicant disclosed in the past "Parallel Type Vehicle Hybrid Power Apparatus" which was patented by Taiwan Pat. No. 242390 in which a variety of powers are effectively combined to impart to a vehicle. The apparatus is composed of rotatable output shaft; a first bevel gearing coupled with the output shaft to rotate in one direction with respect to the output shaft; a second bevel gearing rotatable coupled with the output shaft to rotate in the direction reverse to the first one; at least one third bevel gearing intercalated between the first and second bevel gearings fixedly engaged to the rotating output shaft; a third bevel gearing rotatable coupled with the output rotating shaft and mated with the first and the second bevel gearings; a first power source (engine) for driving the first bevel gearing to rotate in its direction; a second power source (motor/generator) for driving the second bevel gearing to rotate with respect to the output shaft. When the first power source (engine) drives the first bevel gearing to rotate with respect to the output shaft, the first bevel gearing drives the third bevel gearing to in turn drive the output shaft to rotate, and at the same time, the first bevel gearing drives the second bevel gearing to rotate via the third bevel gearing so as to actuate the second bevel gearing to initiate the second power source (motor/generator) to charge. When the second power source (motor/generator) drives the second bevel gearing to rotate with respect to the output shaft, the second bevel gearing drives the third bevel gearing to make the output shaft to rotate. When the first and the second power sources (engine, motor/generator) drive the first and the second bevel gearings respectively to rotate with respect to the output shaft, the first and the second bevel gearings drive the third bevel gearing to rotate the output shaft.

Accordingly, the applicant aforesaid apparatus is able to apply only one power source, or combine the two power sources in one power to output, and also able to use one of the two to charge the other.

Besides, the applicant disclosed "Method of Electrical and Parallel Control for hybrid Power Source" which was patented by Taiwan Pat. No 1268877 in which a better power management is elucidated.

Now, through a long term efforts of study and experimentation, the applicant successfully with integrative combined vehicle power allotment mechanism of the present invention which he believes, definitely will be more effective and contributory for the improvement of vehicle power source, and is elucidated herein below.

SUMMARY OF THE INVENTION

Accordingly, the present invention is to provide an integrative combined vehicle power allotment mechanism which is composed at least of a transmission element and two different power sources dexterously combined to serve the vehicle either as an independent or integrative combined power source to drive the vehicle in the most effective and optimistic state, moreover, one of the two power sources can act as an energy charger for the other in case of need.

Another, the present invention is to make the allotment of the electric and mechanical power properly arranged to adjust the power output to the vehicle in the best mood.

The power allotment mechanism comprises following component parts:

an electric energy unit which is a storage battery for outputting electric power, or can be recharged with a reversed current to restore the consumed energy;

an electric power control unit in connection with the electric energy unit for controlling the power output and input of the electric energy unit;

an electric power unit which is a dynamo (motor-generator), in connection with the electric power control unit at its one end, and in connection with a power allotment unit at the other end thereof, under the control of the electric power control unit, it is driven to operate, or charge the electric energy into the electric energy unit to cause the electric energy unit to output or store electric energy;

a heat power unit which is an internal combustion engine for converting the heat power into a mechanical power to output from an output shaft;

a one-way clutch unit with an input end and an output end, where its input end is in connection with the output shaft of the heat power unit with a transmission element, while the output end thereof is in connection with the power allotment unit.

The aforesaid power allotment unit is composed of first to fourth transmission elements; a connecting shaft, a mandrel; and several bearings, where each of the four transmission elements is a gear wheel, each transmission element drives its corresponding transmission element respectively to rotate by gear mating. The second transmission element has a bearing, which also serves as the bearing for the mandrel, and the third and fourth transmission elements have a common bearing, which further serves as the bearing for the connecting shaft, and the connecting shaft is engaged with the mandrel.

A speed-changing unit in connection with the power allotment unit at its one end, and in connection with the transmission means for varying the rotating speed of the output shaft.

BRIEF DESCRIPTION OF THE DRAWINGS

The drawings disclose two illustrative embodiments of the present invention, which serve to exemplify the various advantages and objects hereof, and are as follows.

DETAILED DESCRIPTION OF THE PREFERRED EMBODIMENT

Figure 1:
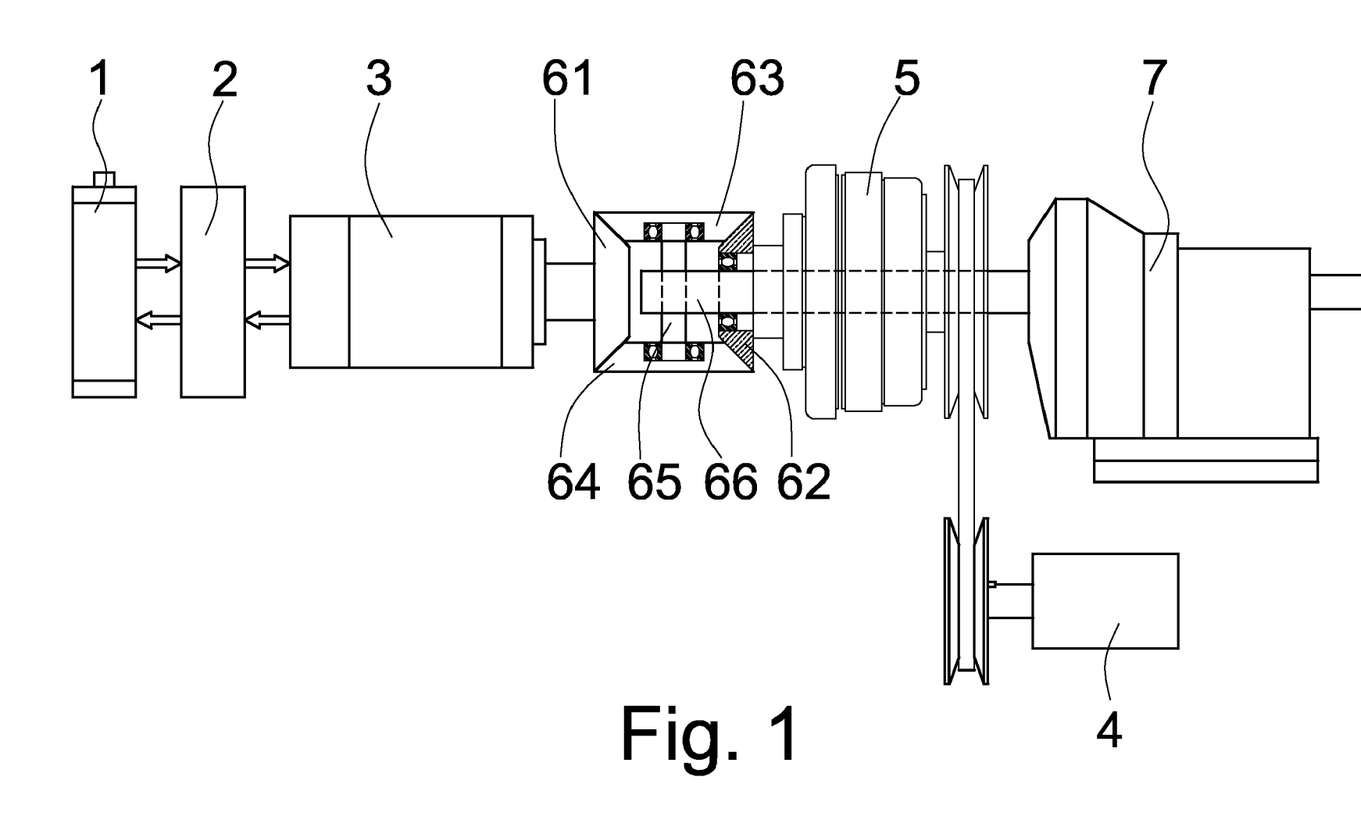
FIG. 1 is a schematic view of the layout of the components of the present invention.

Referring to FIG. 1, the integrative combined vehicle power allotment mechanism of the present invention comprises an electric energy unit (1); an electric power control unit (2); an electric power unit (3); a heat power unit (4); a one-way clutch unit (5); and a power allotment unit. The power is supplied to the power allotment unit from the electric power unit (3) and the heat power unit (4), whereat it is allotted properly for output.

The electric energy unit (1) is a storage battery for supplying the electric power as an output, or can be reversely charged to restore electric energy. The storage battery usable as the electric energy unit (1) may be the types of lead acid, alkaline, Fe—Ni, Zn—Ag$_2$O, H-metal, Na—S no aqueous electrolyte, solid electrolyte, and Li-iron, all of those are well known to persons skill in the art.

The electric power control unit (2) is in connection with the electric energy unit (1) for controlling and driving the electric energy unit (1) to supply energy to the electric power unit (3), or reverse the direction of current of the electric power unit (3) thereby restoring the electric energy in the electric energy unit (1).

The electric power unit (3) is a dynamo (motor-generator) in connection with the electric power control unit (2) at one end, and in connection with the power allotment unit at the other end thereof. The electric power control unit (2) controls the direction of power flow of the electric energy unit (1) so as to drive the electric power unit (3) to operate or charge the electric energy unit (1) thereby restoring its electric energy. If the electric power unit (3) is a motor, the power is outputted, if it is a generator, then the electric energy unit (1) is charged to restore electric energy, so that it can serve to output either power or charging the electric energy unit (1).

The heat power unit (4) is an internal combustion engine for converting the heat power into mechanical power to output from an output shaft.

The one-way clutch unit (5) has an input and an output ends. The input end is coupled with a belt conveyor which is connected to an output shaft of the hear power unit (4) with a transmission means (either a conveyor belt or a sprocket); while the output end thereof is in connection with the power allotment unit.

The power allotment unit receives the power supplied by the electric power unit (3), heat power unit (4), or other power collaborated with the above two units and output the resultant power after proper allotment. The power allotment unit comprises first to fourth transmission elements (61), (62), (63) and (64), a connecting shaft (65), a mandrel (66) and several bearings, all of the transmission elements are gear wheels, and each drives its corresponding transmission element to rotate by gear mesh. The second transmission element (62) has a bearing, which further serves as the bearing for the mandrel (66). The third and the fourth transmission elements (63) and (64) have a common bearing which further serves as the bearing for the connecting shaft (65), and the connecting shaft (65) is engaged with the mandrel (66).

The speed change unit (7) is in connection with the power allotment unit at its one end, and in connection with the transmission means at the other end for varying the rotating speed of the output shaft.

A first embodiment of the present invention when a motor is used as the electric power unit (3) will be illustrated herein below. In this case the power of the motor is inputted to the power allotment unit together with the power from the heat power unit (4) for allotment before outputting.

As shown in FIG. 1, the electric power unit (3) is connected with the first transmission element (61), the one way clutch unit (5) is connected with the second transmission element (62), and the mandrel (66) is connected with the speed change unit (7). In this version, the power of the electric energy unit (1) and the heat power unit 4 is outputted by rotation of the third transmission element (63) and the fourth transmission element (64) which are respectively driven by the first and the second transmission elements (61), (62), and following rotation of the mandrel (66) to operate the speed change unit (7).

Figure 2:
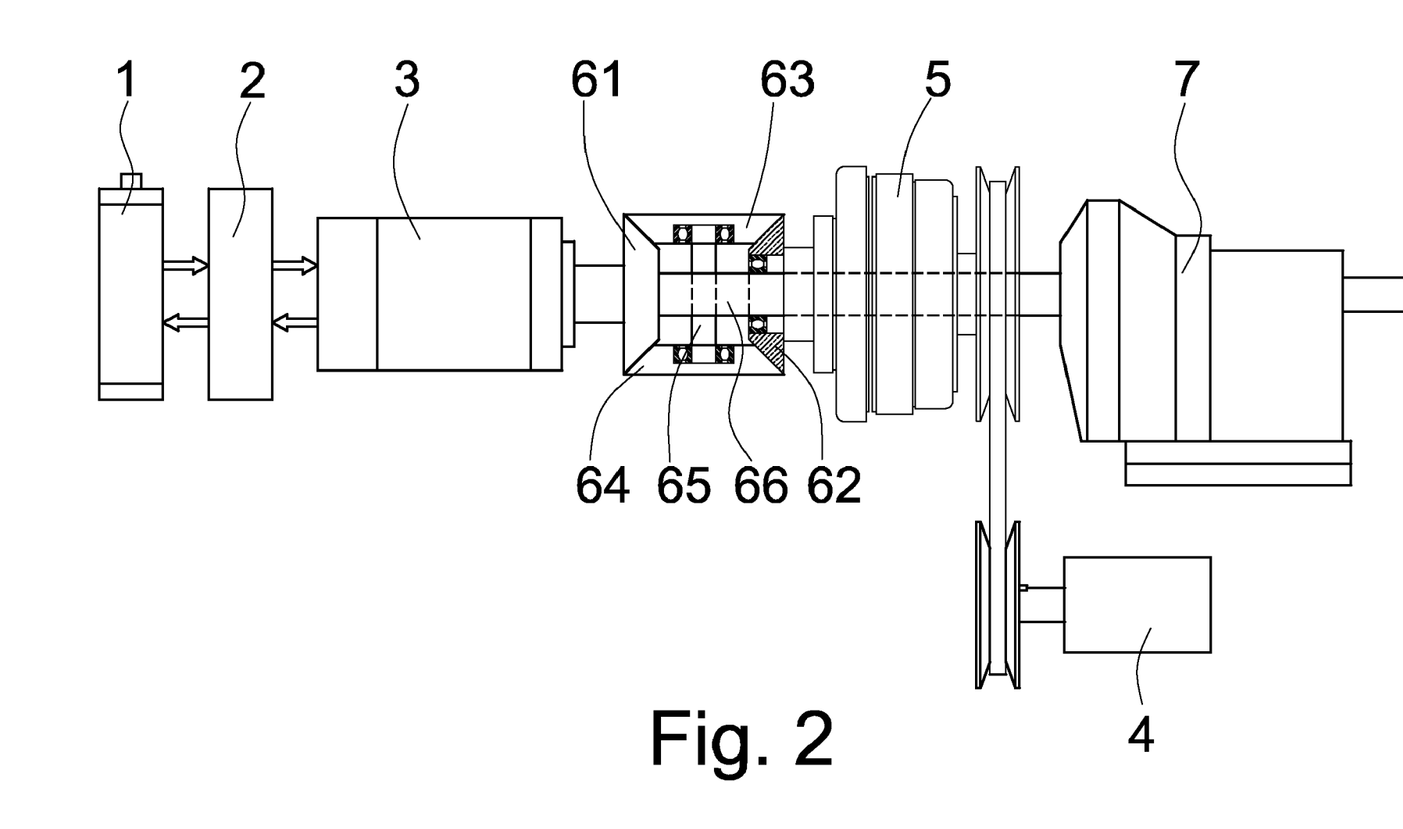
FIG. 2 is a schematic view of another aspect of the layout shown in FIG. 1.

FIG. 2 shows another aspect of the first embodiment shown in FIG. 1 wherein the mandrel (66) is directly connected to the first transmission element (61).

Figure 3:
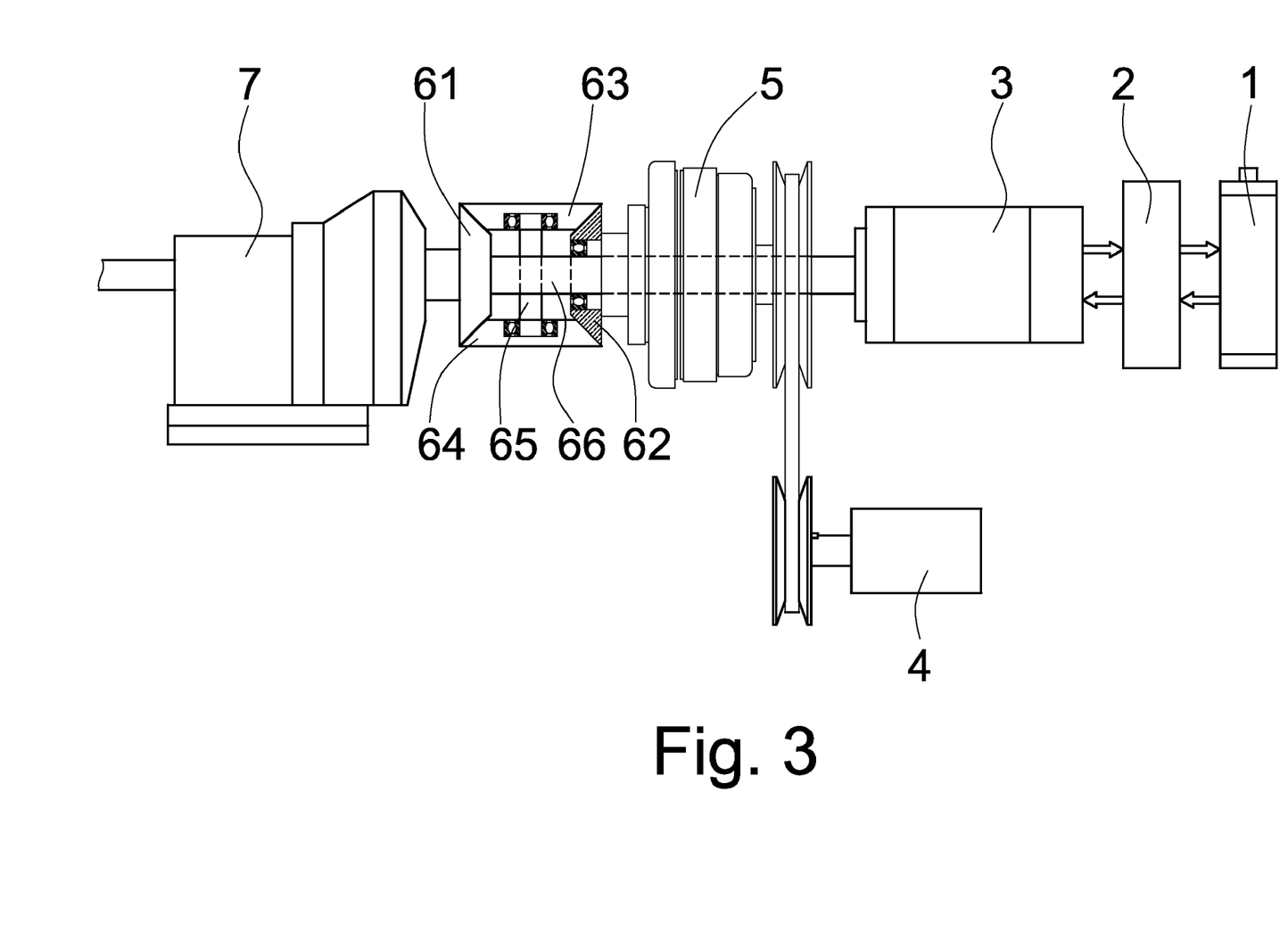
FIG. 3 to FIG. 8 are schematic views showing the various arrangements of the components for different application.

Referring to FIG. 3, the mandrel (66) is connected with the first transmission element (61) and the speed change unit (7), the electric power unit (3) is connected with the first transmission element (61) by way of the mandrel (66), and the one way clutch unit (5) is connected with the second transmission element (62). In this version, the power of the heat power unit (4) is outputted through rotation of the third and fourth transmission elements (63) and (64) driven by the second transmission element (62), furthermore, by driving the first transmission element (61), its power is outputted to the speed change unit (7).

Figure 5:
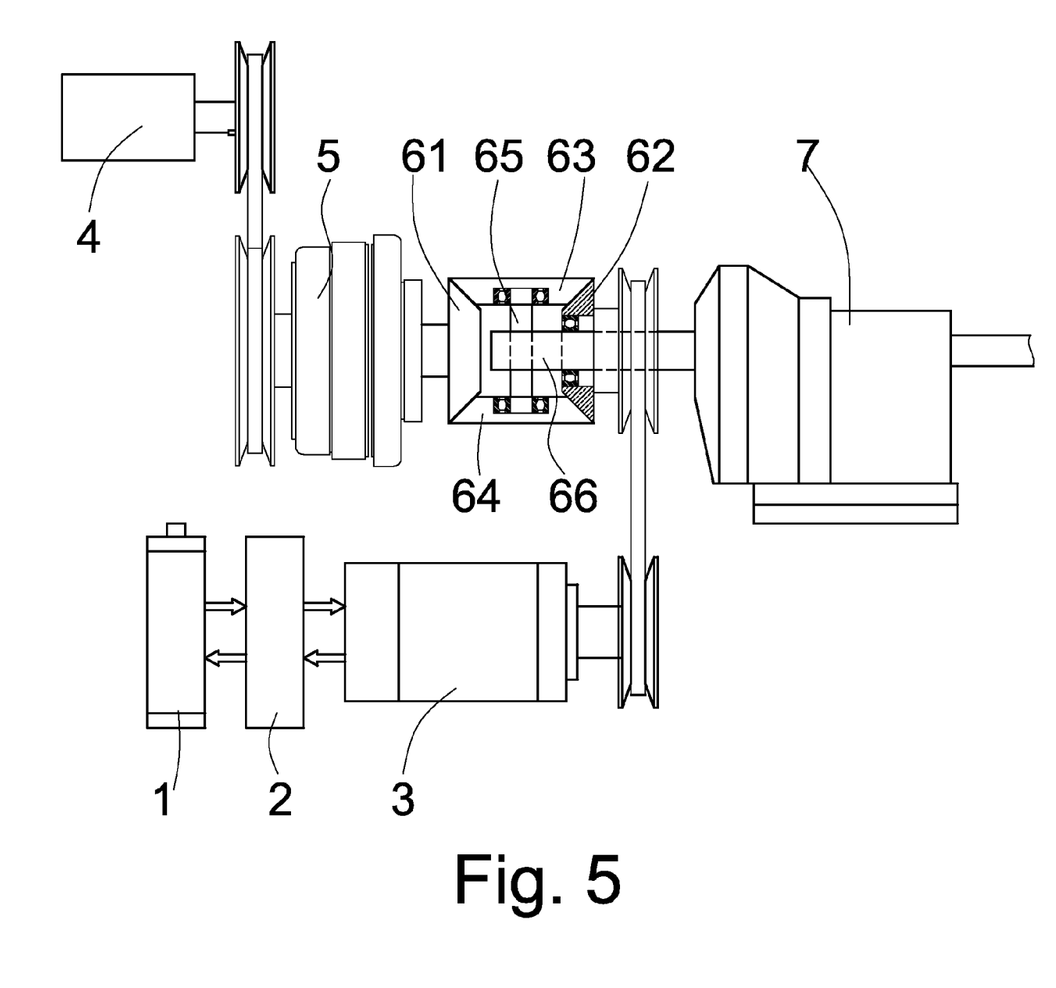

As shown in FIG. 5, the heat power unit (4) imparts its power to the first transmission element (61) via the one way clutch unit (5), and the electric power unit (3) is connected to the second transmission element (62), the mandrel (66) is connected with the speed change unit (7). In this version, the power output of the electric energy unit (1) and the heat power unit (4) can drive the third and fourth transmission elements (63), (64) to rotate by way of the first and second transmission elements (61), (62), and finally the power is outputted from the speed change unit (7) driven by rotation of the mandrel (66).

Figure 6:
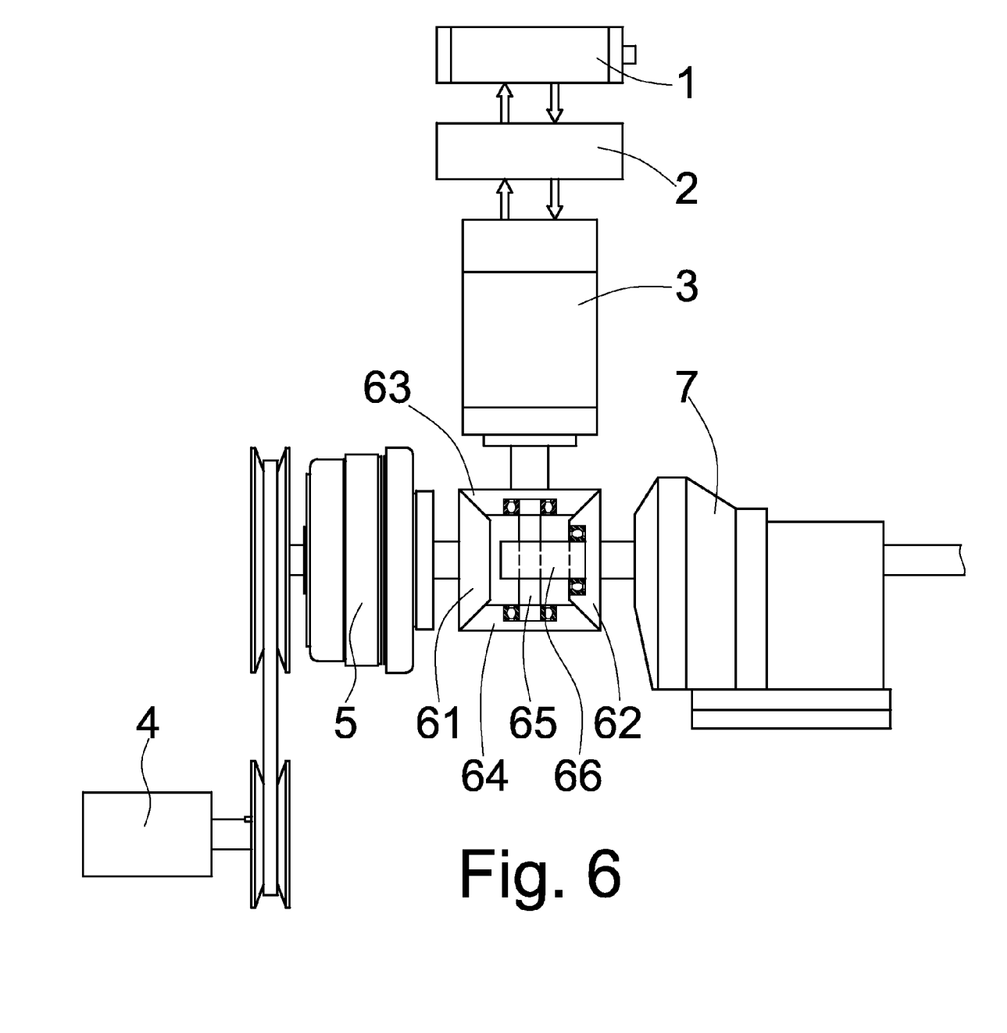

As shown in FIG. 6, the heat power unit (4) is mechanically connected with the first transmission element (61) via one way clutch unit (5), the electric power unit (3) is connected with the third transmission element (63), and the speed change unit (7) is connected with the second transmission element (62). In this version, the power output of the heat power unit (4) can drive the fourth transmission element (64) via the first transmission element (61) so as to combine the power coming from the electric energy unit (1) via the third transmission element (63), and then is used to drive the speed change unit (7) to output the resultant power via the second transmission element (62).

Figure 7:
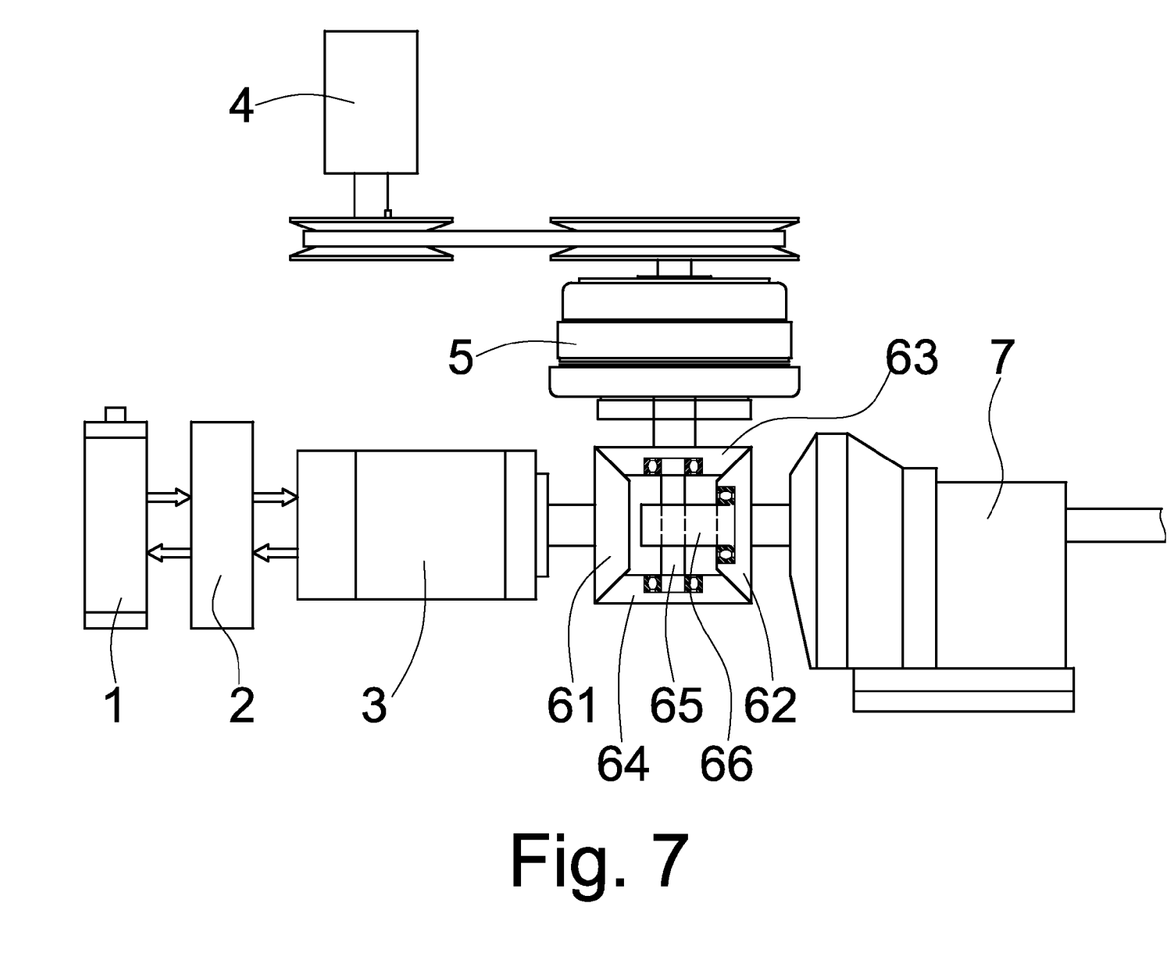

As shown in FIG. 7, the power output of the heat power unit (4) is imparted to the third transmission element (63) via the one way clutch unit (5), while the power of the electric power unit (3) is imparted to the first transmission element (61), the speed change unit (7) is connected to the second transmission element (62). In this version, the power output of the electric energy unit (1), via first and fourth transmission elements (61), (64), comes to combine with the power output of the heat power unit (4) via third transmission element (63), and the resultant power is outputted from the speed change unit (7) driven by second transmission element (62).

Figure 8:
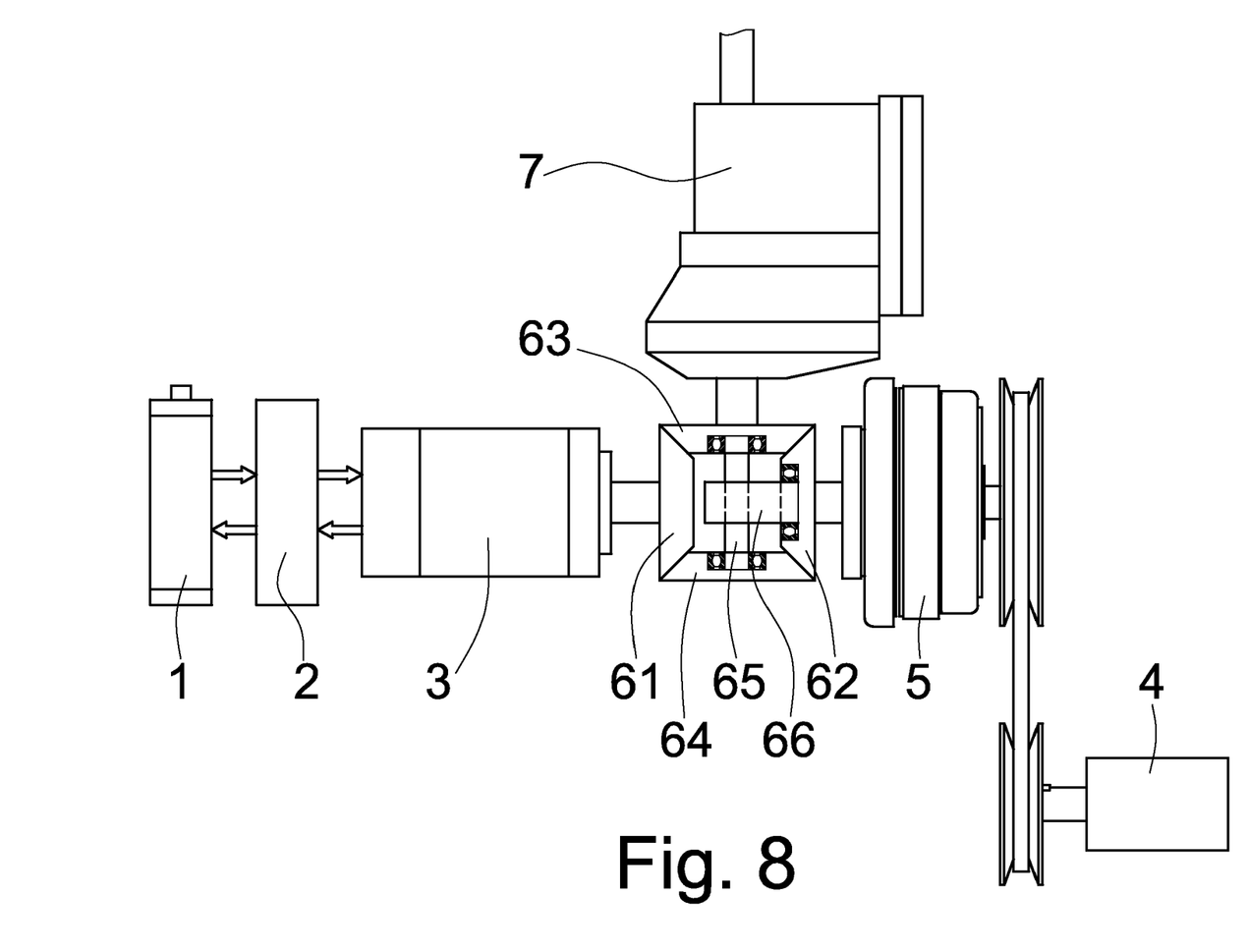

As shown in FIG. 8, the power output of the heat power unit (4) is imparted to the second transmission element (62) via the one way clutch unit (5), while the power of the electric power unit (3) is imparted to the first transmission element (61), and the speed change unit (7) is connected to the third transmission element (63). In this version, the power output of the electric energy (1) via first transmission element (61) comes to combine with the power output of the speed change unit (7) via third transmission element (63), and the resultant power is outputted from the speed change unit (7) driven by third transmission element (63).

In another embodiment of the present invention, the power of the speed change unit (7) and the heat power unit (4) is inputted into the power allotment unit, whereat it is allotted and outputted to the electric power unit (3) and is used to charge the electric energy unit (1).

In this embodiment, any kind of conventional storage batteries previously mentioned in this specification can be used as the electric energy unit (1).

The electric power control unit (2) is connected with the electric energy unit (1) for controlling current flow of the electric power unit (3) to store the electric energy in the electric energy unit (1) by charging the battery.

The electric power unit (3) is a generator, in connection with the electric power control unit (2) at one end, and in connection with the power allotment unit at the other end thereof. The electric power control unit (2) controls the direction of power flow of the electric energy unit (1) so as to enable the electric power unit (3) to charge the electric energy unit (1) thereby restoring its electric energy.

The heat power unit (4) is an internal combustion engine for converting the heat power into mechanical power to output from an output shaft.

The one-way clutch unit (5) has an input and an output ends. The input end is connected to the output shaft of the heat power unit (4) via transmission means (belt conveyor or sprocket), while the output end thereof is in connection with the power allotment unit.

The speed change unit (7) is in connection with the power allotment unit at its one end, and in connection with the transmission means at the other end for varying the speed of the output shaft.

The power allotment unit receives the power from the heat power unit (4), speed change unit (7) or the combined power of the above two units and imparts the resultant power to the electric power unit (3) after proper allotment. The power allotment unit comprises first to fourth transmission elements (61), (62), (63), (64), a connecting shaft (65), a mandrel (66) and several bearings, all of the transmission elements are gear wheels, and each drives its corresponding transmission element to rotate by gear mesh. The second transmission element (62) has a bearing, which further serves as the bearing for the mandrel (66). The third and the forth transmission elements (63) and (64) have a common bearing which further serves as the bearing for the connecting shaft (65), and the connecting shaft (65) is engaged with the mandrel (66).

In a second embodiment of the present invention, the power output of the heat power unit (4) and the speed change unit (7) is supplied to the power allotment unit from where it is outputted to the electric power unit (3) working in the form of a generator.

Figure 4:
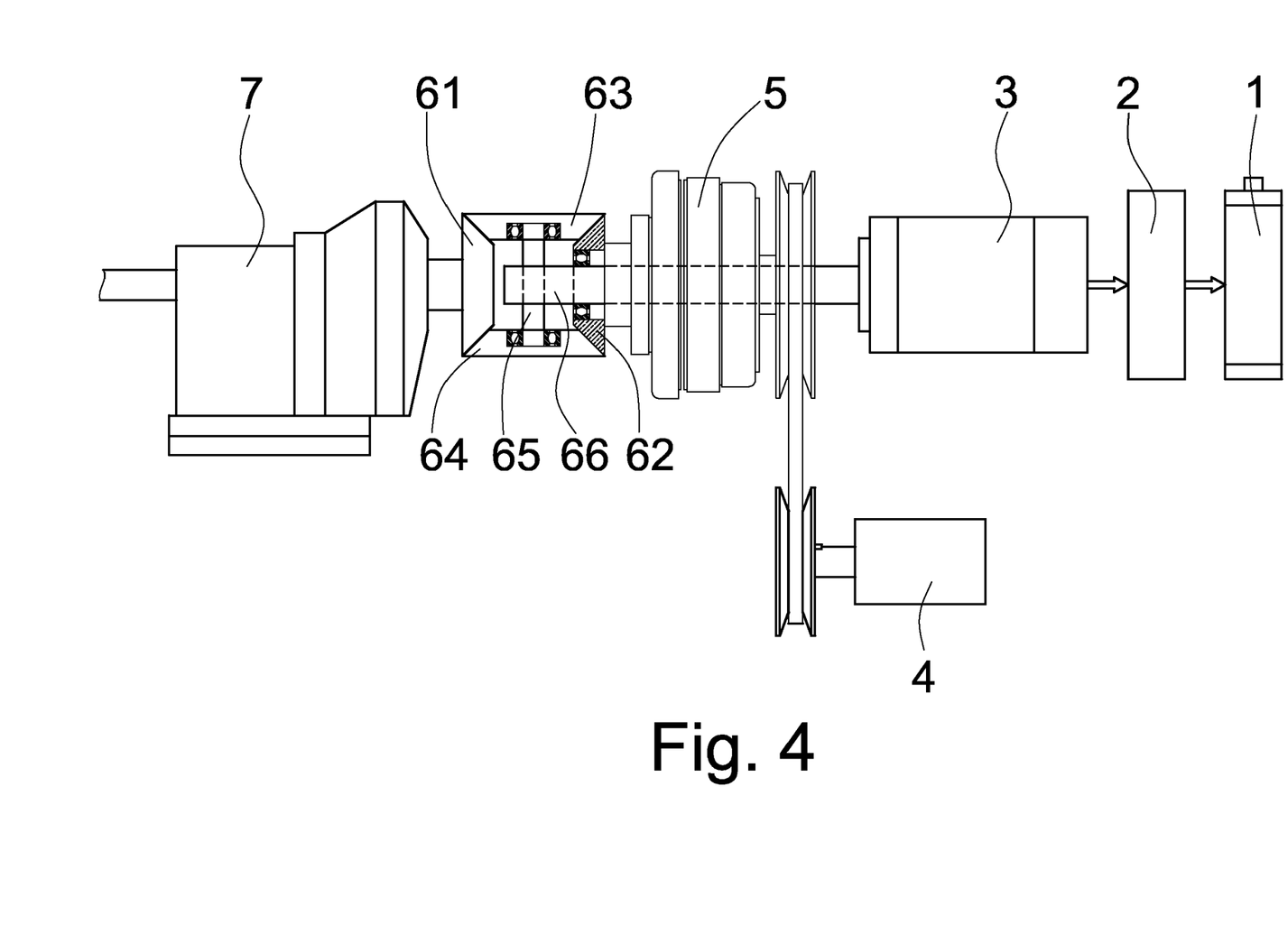

As shown in FIG. (4), the speed change unit (7) is connected with the first transmission element (61), the one way clutch unit (5) is connected with the second transmission unit (62), and the mandrel (66) is connected with the electric power unit (3). In this version, the power output of the speed change unit (7) and the heat power unit (4) can drive the third and the fourth transmission elements to rotate via first and second transmission elements (61) and (62), and then the mandrel (66) follows to drive the electric power unit (3) thereby delivering charging current to charge the electric energy unit (1).

As shown in FIG. 5, the heat power unit (4) imparts its power to the first transmission element (61) via one way clutch unit (5), the mandrel (66) is connected with the speed change unit (7), and the electric power unit (3) is connected to the second transmission element (62) by way of transmission means. In this version, the power output of the heat power unit (4) and the speed change unit (7) can drive the second transmission element (62) to rotate via firs, third and fourth transmission elements (61), (63) and (64) such that the second transmission element (62) can drive the electric power unit (3) to deliver charging current to charge the electric energy unit (1).

As shown in FIG. 6, the heat power unit (4) is mechanically connected with the first transmission element (61) via one way clutch unit (5), the speed change unit (7) is connected with the second transmission element (62), and the electric power unit (3) is connected to the third transmission element (63). In his version, the output power of the heat power unit (4) and the speed change unit (7) can drive the third transmission element (63) to rotate via first and second transmission elements (61) and (62) such that the electric power unit (3) is actuated to deliver charging current to charge the electric energy unit (1).

As shown in FIG. 7, the speed change unit (7) is connected to the second transmission element (62), the heat power unit (4) imparts its power to the third transmission unit (63) via one way clutch unit (5), and the electric power unit (3) is connected with the first transmission unit (61). In this version, the power output of the speed change unit (7) can drive the fourth transmission unit (64) via second transmission unit (62) and combine with the power of the heat power unit (4) on the third transmission unit (63), and then the electric power unit (3) is activated by the rotation of the first transmission unit (61) to deliver charging current to charge the electric energy unit (1).

As shown in FIG. 8, the power output of the heat power unit (4) is imparted to the second transmission element (62), the speed change unit (7) is connected to the third transmission element (63), and the electric power unit (3) is connected with the first transmission element (61). In this version, the power output of the heat power unit (4) can drive the fourth transmission unit (64) via the second transmission element (62) and combine with the power of the speed change unit (7) on the third transmission unit (63), and then the electric power unit (3) is activated by the rotation of the second transmission element (62) to deliver charging current to charge the electric energy unit (1).

The integrative combined vehicle power allotment mechanism is a synthetic mechanism well applicable for a vehicle to identify the speed (low, medium, high, extra high) thereof with vehicle control system. The electric power unit (3) and the heat power unit (4) may be individually employed as a power source of the vehicle, or jointed to supply power for the vehicle so that there is a wide selectivity for the user.

Meanwhile, when the vehicle is going down along a slope, the power of the heat power unit (4) and speed change unit (7) maybe individually or conjointly employed by the vehicle through the control of the vehicle control system to charge the electric energy unit (1).

Many changes and modification in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. An integrative combined vehicle power allotment mechanism comprising:
    an electric energy unit which is a storage battery for outputting electric power;
    an electric power control unit in connection with said electric energy unit for controlling a direction of power output;
    an electric power unit in connection with said electric power control unit at one end, and in connection with a power allotment unit at the other end thereof, wherein it is driven to operate by output of said electric energy unit under control of said electric power control unit;
    a heat power unit which is a device for converting heat power to mechanical power to output said mechanical power from an output shaft;
    an one way clutch unit having an input end and an output end, wherein an input end thereof is in connection with the output shaft of said heat power unit with a transmission element, whereas an output end thereof is in connection with said power allotment unit; and
    said power allotment unit composed of first to fourth transmission elements, a connecting shaft, a mandrel, and several bearings, wherein each of four transmission elements drives corresponding transmission element thereof respectively to rotate by a gear mesh, said second transmission element has a bearing which also serves as the bearing for said mandrel, and said third and fourth transmission elements have a common bearing which further serves as the bearing for said connecting shaft, and said connecting shaft is engaged with said mandrel.

2. The mechanism of claim 1, wherein said electric power unit is a dynamo acting as a motor.

3. The mechanism of claim 1, wherein said electric power unit is a dynamo acting as a generator.

4. The mechanism of claim 1, wherein said heat power unit is an internal combustion engine.

5. The mechanism of claim 1, wherein said transmission elements are gear wheels, one drives the other to rotate by gear mesh.

6. An integrative combined vehicle power allotment mechanism comprising:
    an electric energy unit which is a storage battery acceptable of charging current opposite to that of a discharge current thereof to store electric energy;
    an electric power control unit in connection with said electric energy unit for controlling a direction of power output;
    an electric power unit in connection with said electric power control unit at one end, and in connection with a power allotment unit at the other end thereof, wherein it is driven to charge said electric energy unit to store electric energy under controlling input to it by said electric power control unit;
    a heat power unit which being a device for converting heat power to mechanical power to output said mechanical power from an output shaft;
    a one way clutch unit having an input end and an output end, wherein its input end is in connection with the output shaft of said heat power unit with a transmission element, whereas the output end thereof is in connection with said power allotment unit;
    said power allotment unit composed of first to fourth transmission element, a connecting shaft, a mandrel, and several bearings wherein said second transmission element has a bearing which further serves as the bearing for said mandrel, said third and fourth transmission elements have a common bearing which further serves as the bearing for said connecting shaft, and said connecting shaft is engaged to said mandrel, and;
    a speed change unit in connection with said power allotment unit for varying operating speed of the input.

7. The mechanism of claim 6, wherein said electric power unit is a dynamo acting as a generator.

8. The mechanism of claim 6, wherein said electric power unit is a dynamo acting as a motor.

9. The mechanism of claim 6, wherein said heat power unit is an internal combustion engine.

10. The mechanism of claim 6, wherein said transmission elements are gear wheels, one drives the other to rotate by gear mesh.

* * * * *